Sept. 20, 1932.  J. J. LAWTON  1,878,933
PROCESS OF TREATING SLUDGE ACID
Filed May 29, 1929
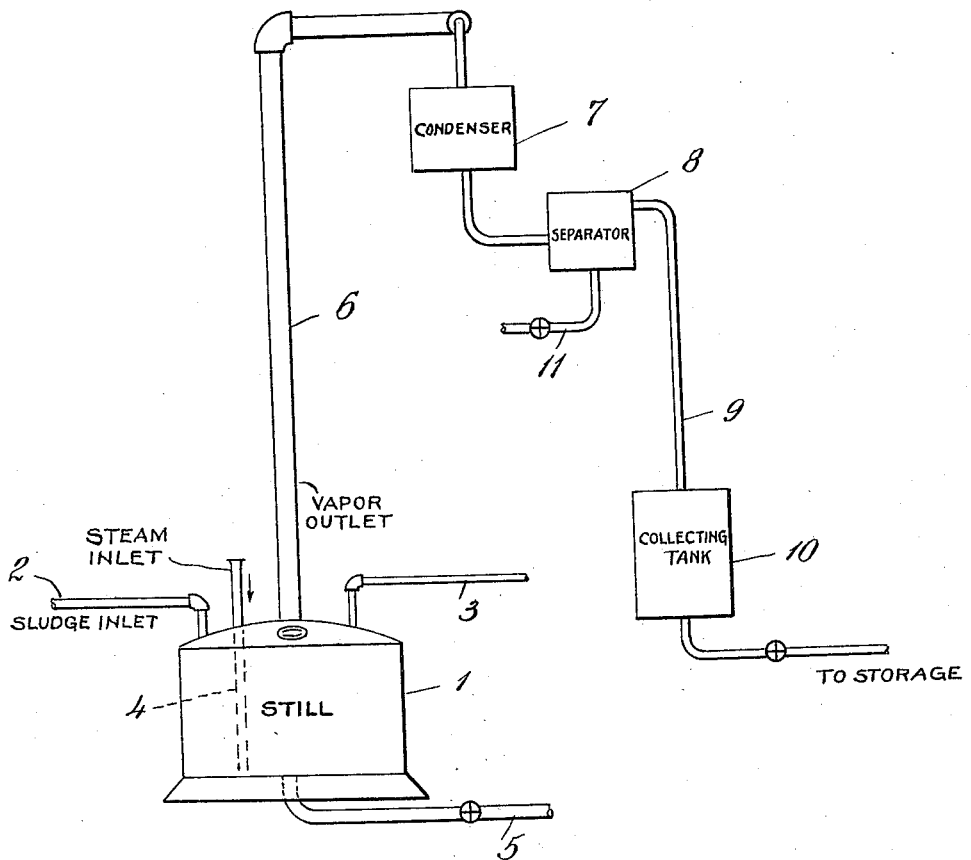
INVENTOR
JOSEPH J. LAWTON
BY *Forbes Sileby*
ATTORNEY Patented Sept. 20, 1932

1,878,933

UNITED STATES PATENT OFFICE

JOSEPH J. LAWTON, OF SYRACUSE, NEW YORK, ASSIGNOR TO SEMET-SOLVAY COMPANY, OF NEW YORK, N. Y., A CORPORATION OF NEW YORK

PROCESS OF TREATING SLUDGE ACID

Application filed May 29, 1929. Serial No. 366,977.

The present invention relates to the treatment of acid sludges produced in the purification of oils by washing with acid, and particularly to a method of recovering light oil from the acid sludge produced in the purification of crude coke oven light oil by treatment with sulfuric acid.

Acid sludges having characteristics which adapt them for treatment according to my invention are produced as waste products in the purification of crude coke oven light oil or similar oils by washing with sulfuric acid. During this washing or purification treatment certain undesirable constituents of the oil such as olefins are separated by mixing the sulfuric acid with the oil and then agitating the mixture until the impurities are combined with or absorbed in the acid. The mixture is then allowed to stand until a heavy acid sludge settles out which is drawn off and usually discarded as waste.

Disposal of this acid sludge as waste presents a difficult problem since running it off into sewers or otherwise disposing of it is objectionable because of its corrosive and obnoxious nature. In addition, the acid sludge contains a relatively large amount of the valuable light oil which cannot be removed therefrom simply by settling and decantation. Various attempts have been made to recover the light oil content of the acid sludge and to convert the sludge into a product, which if not of value, is a harmless and unobjectionable waste product. Treatments have been attempted which involved subjecting the acid sludge to distillation. This presents difficulty because of the corrosive and viscous nature of the material and the solid pitch or coke-like nature of the resulting residue.

Another residue or by-product of the light oil refining process which has little value and which is difficult to dispose of as waste is the "still residue" from the distillation of the light oil following the sulfuric acid washing treatment. The major part of this residue consists of polymerized compounds of the coumarone-indene series.

The object of my invention is the provision of a process for treating acid sludge which is simple and inexpensive both as to operation and apparatus, which utilizes the above "still residue", by which the valuable light oil content of the acid sludge is recovered to a substantially complete extent and which gives a liquid residue, as distinguished from a solid or semi-solid residue, which may be readily removed from the apparatus and conveyed through pipe lines.

I have discovered that by first incorporating with the sludge a fluid residue from the distillation of coke oven light oil or similar oils such as the "still residue" hereinabove referred to, the valuable light oil content of acid sludge may readily be recovered to a substantially complete extent through a distillation operation, the distillation mass remains fluid during the entire distillation operation and furthermore, the residue from the distillation is also fluid. According to my invention, this mixture is subjected to heat preferably by introducing steam directly into the mixture. This distillation operation drives off the light oil content of the acid sludge as a gas which is then condensed, separated from the aqueous condensate fraction and recovered as a valuable product. The residue in the still is liquid and may be directly withdrawn from the apparatus and disposed of through pipe lines or by other suitable means. No mechanical agitation of the acid sludge mixture is required during the distillation and no special equipment is necessary to remove the residue from the still. Furthermore, as the acid sludge remains liquid during the entire distillation operation, the maintenance of the necessary temperature for its distillation is simplified as compared with processes heretofore proposed where the distillation mass became progressively non-viscous and finally semi-solid or solid during the course of the distillation. Various other features and advantages of my invention will be set forth in the following description and accompanying drawing which are illustrative of my invention.

Referring to the drawing, a still 1 is provided with valved inlet pipes 2 and 3 for the introduction of the acid sludge and residue from coke oven light oil and residue from the distillation of coke oven light oil respectively. The still is also provided with a pipe 4 for the introduction of steam and with the conduit 5 for the withdrawal of the fluid residue from the still after the completion of the distillation operation. Extending from the still is pipe 6 for the removal of the distillation vapors. This pipe connects with a cooling coil 7 for the condensation of the gaseous distillation. This cooling coil or condensing coil in turn is connected with separator 8 wherein the oil fraction of the distillate separates from the aqueous fraction. This oil fraction is withdrawn through conduit 9 and collected as product in tank 10.

Copper is the preferred material for the apparatus to be used in carrying out my process. I have found that copper is particularly resistant to the corrosive action of the mixture in the still and the vapors which may have an acid reaction. The still may be made of cast iron lined with copper plate. Instead of copper, other acid resisting materials may be used, but they are for the most part more expensive than copper.

I will now illustrate the practice of my invention employing the above apparatus for the treatment of a typical acid sludge obtained during the treatment of crude coke oven light oil.

The charge of the acid sludge is introduced into the still 1 through pipe 2. Then the residue from the distillation of a crude coke oven light oil, such for example as results after the usual and well known treatment of such an oil with sulfuric acid, is introduced into the still through pipe 3 preferably in amount approximately equal in volume to that of the sludge introduced through pipe 2. After closing the valves in these charge pipe lines, steam is introduced directly into the mixture at a pressure of about 150 pounds through pipe 4 which projects into the acid sludge mixture in the still and opens near the bottom of the still. The mixture is heated by this direct steam treatment and the evolved light oil and aqueous vapors pass off through pipe 6 and are condensed in the cooling coil 7. When the light oil content of the acid sludge has been substantially removed, the steam treatment is discontinued. The residue in the still is still liquid and is withdrawn through conduit 5.

This condensate passes from the condenser 7 into separator 8 where the light oil fraction is separated from the aqueous condensate fraction. The light oil condensate is withdrawn through pipe 9 to the collecting tank 10 and the aqueous condensate is withdrawn through pipe 11.

Acid sludge as usually obtained in the treatment of coke oven light oil, contains from 30–40% available light oil and substantially all this light oil is recovered by the process of my invention.

While I have indicated equal quantities of acid sludge and oil distillation residue as preferable, this proportion may be varied depending on the characteristics of the particular sludge and residue which are used and on the degree of fluidity which it is desired to produce in the residue from the distillation of the acid sludge. The oil admixed with the acid sludge should be a heavy high boiling oil resistant or inert to the action of the sulfuric acid and other ingredients of the sludge and the distillation treatment such that it may function in accordance with my invention.

I claim:

1. A process of treating acid sludge obtained in the treatment of coke oven light oil and similar oils which comprises forming a mixture of said acid sludge and a heavy high boiling inert oil and then distilling off from said mixture the volatile content of the acid sludge thereby causing a fluid residue to remain after the distillation of said mixture.

2. A process of treating acid sludge obtained in the purification of coke oven light oil and similar oils with sulfuric acid which comprises forming a mixture of said acid sludge and residue from the distillation of such oils and heating said mixture to distill off volatile oil content of the acid sludge thereby causing a fluid residue to remain after the distillation of said mixture.

3. A process of treating acid sludge obtained in the purification of coke oven light oil and similar oils with sulfuric acid which comprises forming a mixture of said acid sludge and residue from the distillation of such oils and subjecting said mixture to direct steam distillation to vaporize volatile oil content of the acid sludge thereby causing a fluid residue to remain after the distillation of said mixture.

4. A process of treating acid sludge obtained in the purification of coke oven light oil with sulfuric acid which comprises forming a mixture of said acid sludge and a high boiling residue from the distillation of said oil in approximately equal proportions by volume and subjecting said mixture to direct steam distillation to vaporize the light oil content of the acid sludge thereby causing a fluid residue to remain after the distillation of said mixture.

5. That improvement in the process of recovering the oil content of acid sludge obtained in the purification of coke oven light oil and similar oils with sulfuric acid by distillation which comprises admixing with said acid sludge a residue from the distillation of such oils whereby a fluid residue remains after the distillation of the acid sludge.

6. That improvement in the process of recovering the light oil content of acid sludge obtained in the purification of coke oven light oil with sulfuric acid by direct steam distillation, which comprises admixing with said acid sludge a high boiling residue from the distillation of light oil after sulfuric acid treatment and distilling the resultant mixture whereby the light oil content is recovered and a fluid residue remains which may be carried through pipe lines.

7. A process of treating acid sludge obtained in the purification of coke oven light oil and similar oils with sulfuric acid which comprises forming a mixture of said acid sludge and a heavy high boiling inert oil, and distilling said mixture to drive off the volatile oil content of the acid sludge whereby a fluid residue remains after the distillation of said mixture.

In testimony whereof, I hereunto affix my signature.

JOSEPH J. LAWTON.